United States Patent
Kouskoulas et al.

(10) Patent No.: US 12,190,128 B1
(45) Date of Patent: Jan. 7, 2025

(54) METHODS AND SYSTEMS FOR IDENTIFYING CONTROL FLOW PATTERNS IN SOFTWARE CODE TO DETECT SOFTWARE ANOMALIES

(71) Applicant: Affirm Logic Corporation, McLean, VA (US)

(72) Inventors: Yanni Kouskoulas, Seattle, WA (US); Ada Lindberg, Knoxville, TN (US); Arion Lawrence, Vienna, VA (US); Chris O'Ferrell, Burleson, TX (US)

(73) Assignee: Affirm Logic Corporation, McLean, VA (US)

( * ) Notice: Subject to any disclaimer, the term of this patent is extended or adjusted under 35 U.S.C. 154(b) by 0 days.

(21) Appl. No.: 18/498,999

(22) Filed: Oct. 31, 2023

(51) Int. Cl.
  *G06F 9/445* (2018.01)
  *G06F 9/48* (2006.01)

(52) U.S. Cl.
  CPC ........ *G06F 9/44521* (2013.01); *G06F 9/4843* (2013.01)

(58) Field of Classification Search
  CPC .................................................. G06F 9/4452
  See application file for complete search history.

(56) References Cited

U.S. PATENT DOCUMENTS

| | | | |
|---|---|---|---|
| 9,038,033 B1 * | 5/2015 | Hidayat | G06F 8/33 717/129 |
| 9,507,945 B2 | 11/2016 | Kouskoulas et al. | |
| 9,824,216 B1 | 11/2017 | Khalid et al. | |
| 10,445,502 B1 | 10/2019 | Desphande et al. | |
| 10,803,051 B2 | 10/2020 | Deb et al. | |
| 11,645,388 B1 | 5/2023 | Kimball et al. | |
| 11,979,428 B1 | 5/2024 | Ismael et al. | |
| 2010/0293407 A1 | 11/2010 | Locasto et al. | |
| 2014/0026127 A1 * | 1/2014 | McEwan | G06F 8/443 717/146 |
| 2016/0371494 A1 | 12/2016 | Daymont | |
| 2017/0199730 A1 | 7/2017 | Hay et al. | |
| 2018/0316715 A1 | 11/2018 | Liu et al. | |
| 2019/0207969 A1 | 7/2019 | Brown | |
| 2021/0099483 A1 | 4/2021 | Shukla | |

OTHER PUBLICATIONS

[Author Unknown] "Open Source Ghidra, The First Few Months," Recon MTL 2019, 51 pages.
[Author Unknown] "Writing Yara Rules—yara 4.4.0. documentation", 2014, 36 pages. Retrieved online: https://yara.readthedocs.io/en/stable/writingsrules.html.

(Continued)

*Primary Examiner* — Charlie Sun
(74) *Attorney, Agent, or Firm* — COOLEY LLP

(57) ABSTRACT

A method includes receiving, at a processor, (1) machine-readable binary code to be executed at a target processor and (2) a machine-readable control flow pattern that includes one or more library function calls. The method also includes identifying, via the processor, an indication of an execution path in the machine-readable binary code based on the machine-readable control flow pattern. The method also includes transmitting, via the processor, a signal that indicates that the machine-readable binary code includes the one or more library function calls included in the machine-readable control flow pattern.

20 Claims, 7 Drawing Sheets

(56) References Cited

OTHER PUBLICATIONS

Ballenthin et al., "capa: Automatically Identify Malware Capabilities", Threat Research, Jul. 16, 2020 (last updated Nov. 29, 2023), 13 pages.
National Cybersecurity and Communications Integration Center (NCCIC), "Using Yara for Malware Detection", May/Jun. 2015, 1 page.
Non-Final Office Action for U.S. Appl. No. 18/590,781 dated Jun. 12, 2024, 20 pages.
Notice of Allowance for U.S. Appl. No. 18/621,875 mailed Jul. 3, 2024, 12 pages.
Dwyer, M B et al., "Data flow analysis for verifying properties of concurrent programs." Acm Sigsoft Software Engineering Notes 19.5 (1994): pp. 62-75.
Gupta R et al., "A framework for partial data flow analysis." Proceedings 1994 International Conference on Software Maintenance. IEEE, pp. 4-13, 1994.
Olender, K M et al., "Cecil: A sequencing constraint language for automatic static analysis generation." IEEE Transactions on Software Engineering 16.3 (1990): pp. 268-280.

* cited by examiner

500

Receive, at an analysis processor, machine-readable binary code to be executed at a target processor
502

Receive, at the analysis processor, a machine-readable control flow pattern that includes one or more library function calls
504

Identify, via the analysis processor, an indication of an execution path in the machine-readable binary code based on the machine-readable control flow pattern
506

Transmit, via the analysis processor, a signal that indicates that the machine-readable binary code includes the one or more library function calls included in the machine-readable control flow pattern
508

FIG. 5

METHODS AND SYSTEMS FOR IDENTIFYING CONTROL FLOW PATTERNS IN SOFTWARE CODE TO DETECT SOFTWARE ANOMALIES

FIELD

The present disclosure generally relates to software code analysis, and more specifically, to systems and methods for defining and analyzing control flow patterns in software code to detect software anomalies related to cybersecurity.

BACKGROUND

Programs can use function calls to access system resources and complete objectives. In some instances, binary code that includes a pattern of one or more function call sites can be indicative of a software behavior of interest. A software behavior of interest can be indicative of, for example, a software anomaly, malware, and/or a cybersecurity issue. However, the binary code can be difficult to interpret if the source code is unavailable or without executing the binary code. Thus, a need exists for methods and systems for describing patterns of function call sites indicative of software behaviors of interest and performing static analysis on binary code to detect those patterns.

SUMMARY

In an embodiment, a method includes receiving, at a processor, (1) machine-readable binary code to be executed at a target processor and (2) a machine-readable control flow pattern that includes one or more library function calls. The method also includes identifying, via the processor, an indication of an execution path in the machine-readable binary code based on the machine-readable control flow pattern. The method also includes transmitting, via the processor, a signal that indicates that the machine-readable binary code includes the one or more library function calls included in the machine-readable control flow pattern.

In an embodiment, a non-transitory processor-readable medium stores code representing instructions to be executed by one or more processors, and the instructions include code to cause the one or more processors to receive a file that includes executable binary code and parse the executable binary code. The code also causes the one or more processors to identify a pre-defined pattern as being included in the executable binary code and that is associated with at least one instruction, based on (1) a machine-readable specification that defines the pre-defined pattern, and (2) a map associated with the at least one instruction to be called by the executable binary code. The code also causes the one or more processors to generate a signal that indicates that the executable binary code is associated with malware in response to the pre-defined pattern being identified as being included in the executable binary code.

In an embodiment, a non-transitory processor-readable medium stores code representing instructions to be executed by one or more processors, the instructions including code to cause the one or more processors to receive descriptive code that specifies a distinguished software behavior associated with one or more instructions. The code also causes the one or more processors to generate, using a compiler, first machine code based on the descriptive code. The code also causes the one or more processors to receive second machine code that is associated with an executable file and that includes the one or more instructions. The code also causes the one or more processors to perform a lookup operation using an application that is configured to detect the distinguished software behavior based on the first machine code and the second machine code. The code also causes the one or more processors to determine, using the application, that the second machine code includes the distinguished software behavior based on the lookup operation.

BRIEF DESCRIPTION OF THE DRAWINGS

FIG. 5 is a flow diagram showing a method for identifying one or more library function calls associated with a machine-readable control flow program, according to some embodiments.

DETAILED DESCRIPTION

Figure 1:
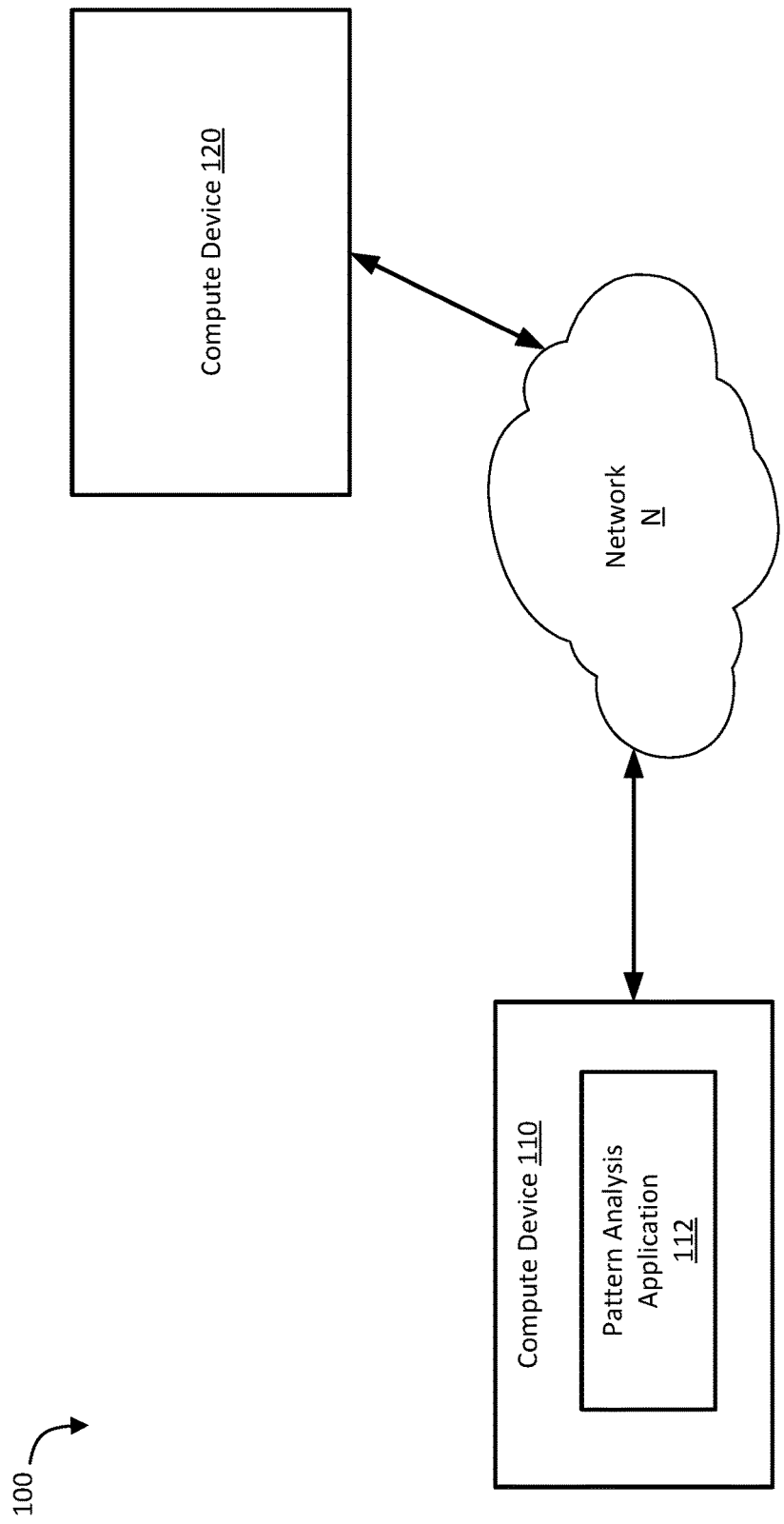
FIG. 1 is a schematic representation of a pattern analysis system for detecting control flow patterns in binary code, according to some embodiments.

A program executed at a compute device can affect (e.g., use, harm, etc.) systems and resources that are internal and external to the compute device. These systems can include, for example, a display, network, memory, other compute devices, and/or the like. Specifically, the program can include atoms (e.g., segments and/or lines) of code that are configured to access system resources to complete an objective. These atoms can be associated with, for example, function calls configured to access privileged (e.g., restricted and/or permission gated) operating system (e.g., kernel) code that can access/use hardware resources (e.g., a display, network, memory, and/or the like). These atoms can include, for example, system call site and/or other specialized instructions. In user-privileged code, for example, system calls can include dynamically loaded system library calls, which can generate soft interrupts to access an operating system (OS). In OS and/or driver code, for example, system calls can include direct call instructions and/or privileged hardware instructions. Given that atoms (e.g., system call sites) can cause a program to use and/or impact external resources, some arrangements of atoms can indicate distinguished software behavior associated with, for example, undesirable software, malicious software (e.g., malware), poorly performing software, vulnerable software, and/or the like.

Malicious software or malicious processes, otherwise referred to as malware, can be intrusive software designed to damage, destroy, or cause harm to computers, computer systems, users, or other entities or devices. Malware can be implemented, distributed, and/or stored via artifacts including computer files ("computer file(s)" or "file(s)") such as text or document files (collectively, "document file(s)") of various filetypes. Such files can be distributed or communicated via network (e.g., Internet) communications. For example, document files can include embedded, executable scripts or macros that, in some cases, can be configured to cause malicious activity on a host device (e.g., a computer) or in a host environment (e.g., of a computer, virtual machine, etc.). Malware can also be associated with a variety of other artifacts including uniform resource locators (URLs), Internet Protocol (IP) addresses, computer processes, registry entries, and/or the like, which may be used, generated, or modified to mediate malware distribution and/or execution. Examples of common malware include viruses, worms, Trojan horse viruses, spyware, adware, and ransomware. In some instances, software can have harmful and/or unintended consequences without the creator of that software having malicious intent/For example, software can exhibit harmful and/or unintended behaviors as a result of human error or an oversight on the part of the creator.

Some embodiments disclosed herein include systems and methods to implement pattern analysis configured to identify distinguished software behavior included in binary data files. The systems and methods can be used, for example, to detect and/or cause prevention of unauthorized use of operating system functions and/or shared library functions. In some implementations, the disclosed systems and methods to implement the pattern analysis can be configured to, for example, detect a distinguished software behavior(s) (e.g., a behavior associated with malware) included in a binary data file without executing the binary data file. In some implementations, the disclosed systems and methods to implement the pattern analysis can be configured to detect distinguished software behaviors included in a binary data file based on a user-defined behavioral specification, as described herein.

FIG. 1 is a schematic diagram of a pattern analysis system 100 for identifying control flow patterns (e.g., arrangements of instructions and/or function call sites) in software code (e.g., binary code), according to an embodiment. The pattern analysis system 100 includes compute devices 110 and 120, and network N. The pattern analysis system 100 can include alternative configurations, and various steps and/or functions of the processes described below can be shared among the various devices of the pattern analysis system 100 or can be assigned to specific devices (e.g., the compute devices 110 and 120, and/or the like).

Each of the compute devices 110 and/or 120 can include any suitable hardware-based computing devices and/or multimedia devices, such as, for example, a server, a desktop compute device, a smartphone, a tablet, a wearable device, a laptop and/or the like. In some implementations, the compute devices 110 and/or 120 can be implemented within a distributed compute framework and/or a remote computing facility. In some implementations, each of the compute devices 110 and/or 120 can be a data center or other control facility configured to run a distributed computing system and can communicate with other compute devices. In some implementations, the compute devices 110 and/or 120 can be included in a client-server configuration. As described herein, at least one of the compute devices 110 and/or 120 can be used for running an application and/or otherwise implementing steps in a method (e.g., a control flow pattern analysis method, as described herein).

In some implementations, the system 100 can include a distributed computing system implemented by three or more compute devices (e.g., one or more compute devices in addition to the compute devices 110 and 120 shown in FIG. 1). In some examples, each compute device from a plurality of compute devices can include one or more of processors, respectively, and one or more memories. The processors can function similar to the processor 220 in FIG. 2, as described below. The memories can function similar to memory 210 in FIG. 2, as described below.

The compute device 110 can be configured to execute (e.g., via an analysis processor) a pattern analysis application 112. The pattern analysis application 112 can include instructions which, when executed by the processor (e.g., the processor 220 of FIG. 2, as described herein), cause the compute device 110 to perform various steps and/or functions (e.g., implementing a control flow pattern search, a function call lookup operation, and other algorithms), as described herein. The pattern analysis application 112 can further include instructions for generating a user interface (e.g., graphical user interface (GUI)) that is configured to collect information from a user (e.g., configuration settings that specify an operating system type, linker strategy, loader strategy, patterns of interest, etc.) and/or display search results and/or program slices, as described herein.

In some implementations, the compute device 120 can be associated with, for example, a user, organization, etc., that intends/desires to execute (e.g., via a target processor included in the compute device 120) code to be analyzed using the pattern analysis application 112. For example, software code can be analyzed via the processor of the compute device 110 to determine if the software code is associated with a software behavior of interest (e.g., a software behavior associated with malware). If, for example, the compute device 110 determines that the software code is not associated with the software behavior of interest, the compute device 110 can be configured to transmit (e.g., via the network N) the software code to the compute device 120, such that the compute device 120 can execute the software code via the target processor. Alternative arrangements of the compute devices 110 and 120 can also exist. For example, the compute device 110 can analyze software code at the compute device 120, the compute device 110 can be a sandbox included on the compute device 120, the compute device 120 can send the software code to the compute device 110 for analysis, after which the compute device can send the software code back to the compute device 120, etc. Alternatively, although not shown in FIG. 1, in some embodiments, the compute device 110 can be associated with a network security measure such as, for example, an "air gap." For example, the compute device 110 can be physically isolated from the compute device 120, and binary code to be analyzed can be manually delivered to the compute device 110. In some instances, the compute device 110 can be configured to analyze the software code without executing the software code via the processor, which can protect the compute device 110 and/or 120 from effects of undesired software behavior.

The compute devices 110 and/or 120 can be networked via the network N directly or indirectly using wired connections and/or wireless connections. The network N can include various configurations and protocols, including short range communication protocols such as, for example, Bluetooth®, Bluetooth® LE, the Internet, World Wide Web, intranets, virtual private networks, wide area networks, local networks, private networks using communication protocols proprietary to one or more companies, Ethernet, WiFi® and HTTP, and various combinations of the foregoing. Such communication can be facilitated by any device capable of transmitting data to and from other compute devices, such as a modem(s) and/or a wireless interface(s).

Figure 2:
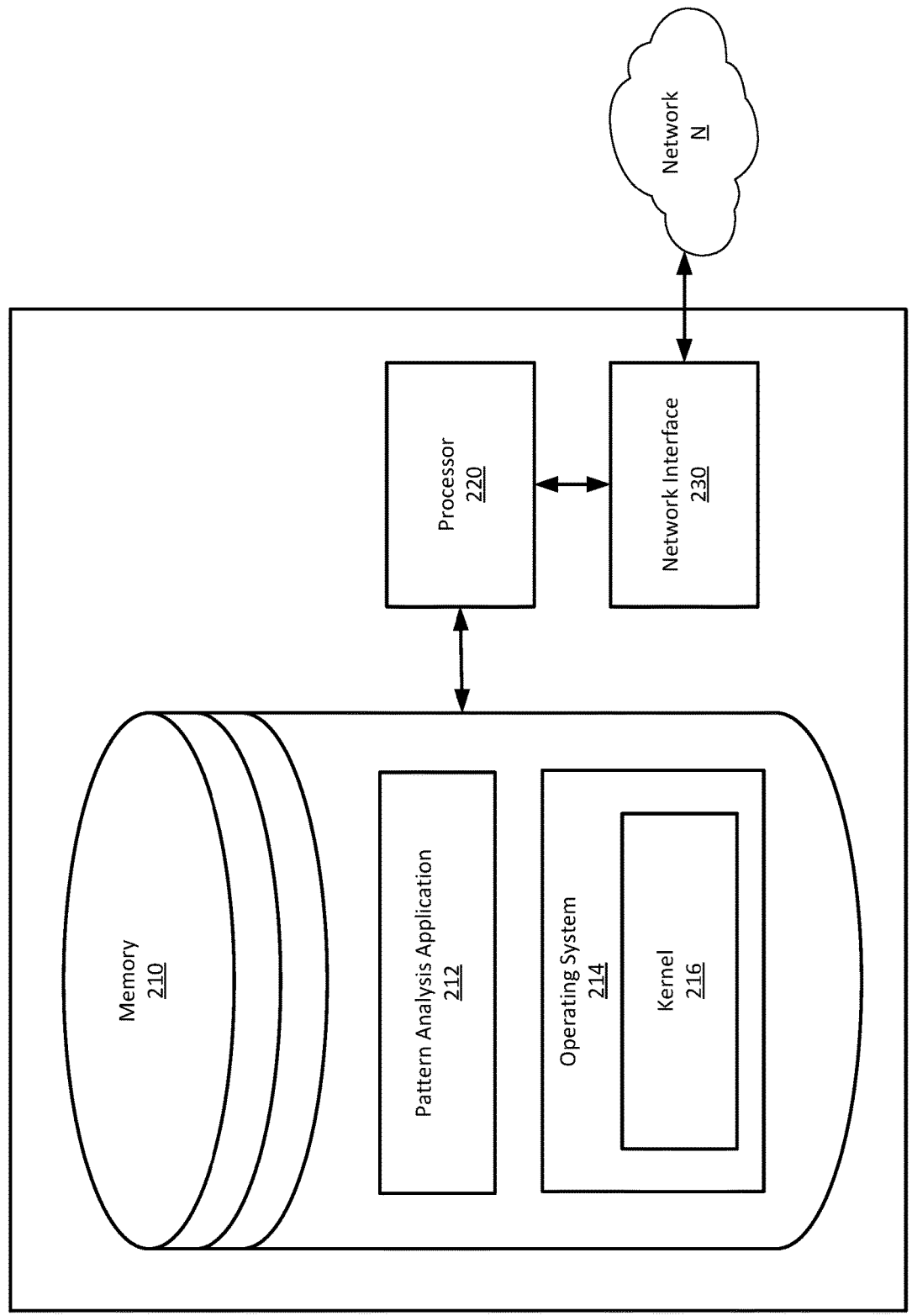
FIG. 2 is a schematic diagram of a compute device included in a pattern analysis system, according to an embodiment.

FIG. 2 is a schematic diagram of a compute device 201 of a system, according to an embodiment. The compute device 201 can be structurally and/or functionally similar to, for example, the compute devices 110 of the system 100 shown in FIG. 1. Compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. Compute device 201 includes a memory 210, a processor 220, and one or more network interface controllers 230.

The processor 220 can be, for example, a hardware based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus).

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server (not shown) can be operatively coupled to the compute device 201.

The memory 210 can store various instructions associated with algorithms and/or data, including pattern analysis algorithms, machine learning algorithms. The memory 210 can further include any non-transitory computer-readable storage medium for storing data and/or software that is executable by processor 220, and/or any other medium, which may be used to store information that may be accessed by processor 220 to control the operation of the compute device 201. For example, the memory 210 can store data associated with the pattern analysis application 212. The pattern analysis application 212 can be functionally and/or structurally similar to the pattern analysis application 112 of FIG. 1. The memory 210 can also store data associated with an operating system 214.

The operating system 214 can include a plurality of programs, functions and/or processes that are routine to the operations of the compute device 201. For example, the operating system 214 can provide functions such as task scheduling, file system management, memory management, caching, profiling, networking (e.g., via the network interface 230, discussed herein), hardware device drivers (e.g., via a device interface controller), and/or the like. The operating system 214 can further include and/or interact with a kernel 216 configured to implement a function of the operating system 214 by providing application programs (e.g., a program that includes the binary code 304 of FIG. 3, described herein) with access to resources associated with the compute device 201. The kernel 216 can be associated with a plurality of system calls that, for example, relate to a filesystem stored in one or more memories (e.g., memory 210 and the like). An operating system can use the filesystem to store, organize, and/or manage files and folders stored on a storage device (e.g., the memory 210).

For example, the kernel 216 can include one or more kernels from a plurality of kernels, each kernel including a program configured to implement a function associated with the operating system (e.g., the operating system 212 of FIG. 2). The kernel 216 can be configured to process system calls (e.g., calls included in the binary code 304, described herein) related to the filesystem. These system calls can include, for example, a call to open a file, a call to close a file, a call to read a directory, a call to obtain file information, a call to create a file, a call to change the size of a file, a call to set metadata (e.g., a name, a modified status, and/or a time) associated with a file, a call to overwrite a file, a call to delete a file, a call to read metadata associated with a filesystem (e.g., metadata associated with the root of a filesystem), a call to write to a file, and/or a call to read from a file. If, for example, the system calls are associated with an undesired software behavior, the filesystem can be compromised, destroyed, copied without authorization, etc.

The one or more network interface controllers 230 can be configured to connect to the network N using, for example, any of the wired and wireless short range communication protocols described above. Moreover, the network N can be or include, for example, one or more of a cellular data network, a satellite network, free space optical network and/or the Internet.

In some instances, the compute device 201 can further include a display, an input device, and/or an output module (not shown in FIG. 2). The display can be, for example, any display device by which the compute device 201 can output and/or display data. The input device can include, for example, a mouse, keyboard, touch screen, voice interface, and/or any other hand-held controller or device or interface via which a user may interact with the compute device 201. The output module can include, for example, a bus, port, and/or other interfaces by which the compute device 201 may connect to and/or output data to other devices and/or peripherals.

Figure 3:
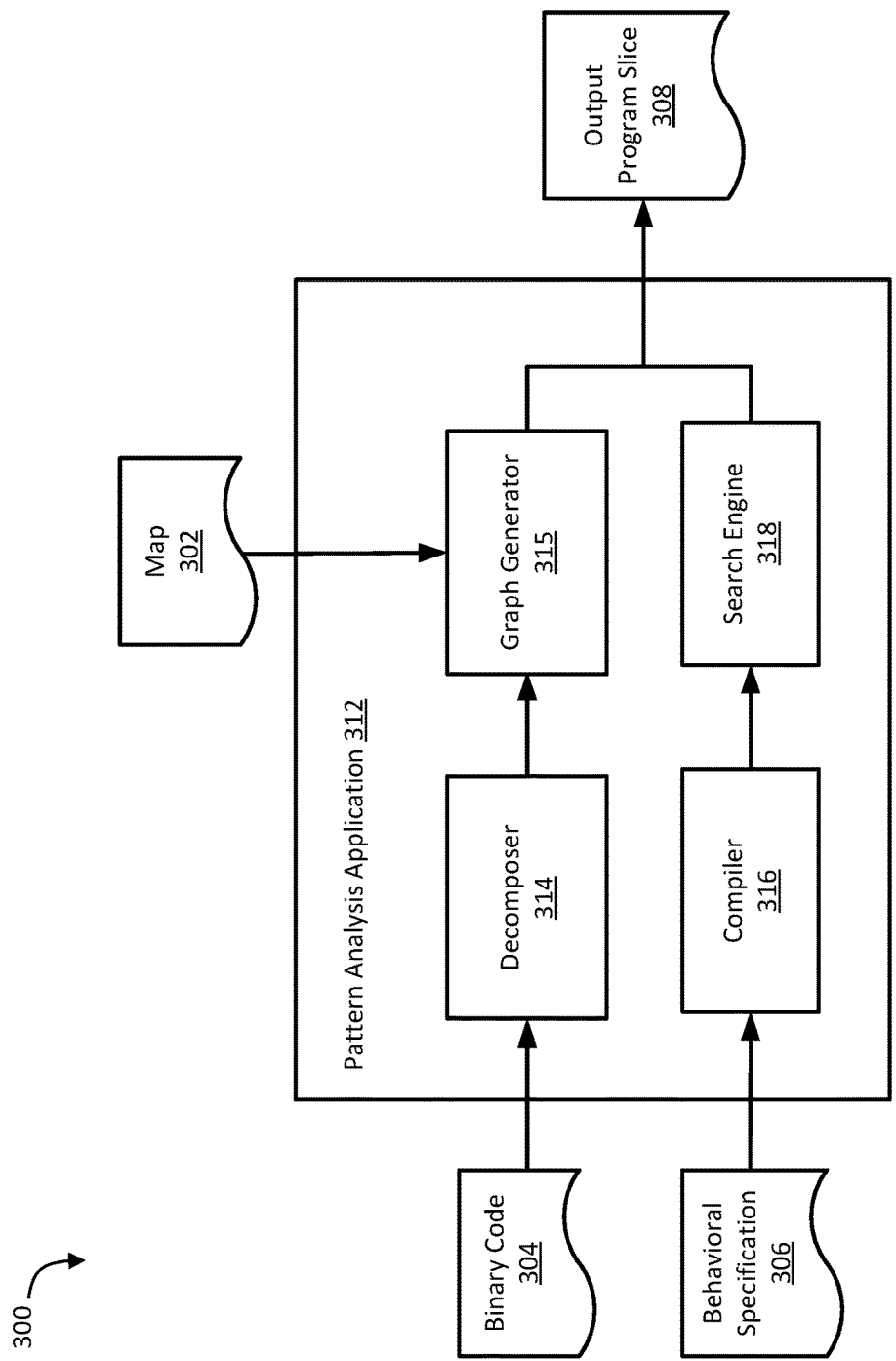
FIG. 3 is a schematic diagram of software code segments included in a pattern analysis system, according to an embodiment.

FIG. 3 is a schematic diagram of software code segments 300 included in a pattern analysis system, according to an embodiment. The software code segments 300 can be associated with a compute device (e.g., a compute device that is structurally and/or functionally similar to the compute device 201 of FIG. 2 and/or the compute device 110 of FIG. 1). In some instances, for example, the software code segments 300 can be implemented in software stored in memory 210 and configured to execute via the processor 220 of FIG. 2. In some instances, for example, at least a portion of the software code segments 300 can be implemented in hardware. The software code segments 300 can include a map 302, binary code 304, a behavioral specification 306, a pattern analysis application 312, and an output program slice 308.

The binary code 304 can be associated with a file (e.g., an executable file, application, and/or the like) to be executed at a target processor (e.g., a processor associated with the compute device 120 of FIG. 1). In some implementations, the binary code can encode data (e.g., character strings) as bit strings. The binary code 304 can represent machine-executable instructions, data, and/or the like, using a symbolic system. For example, the symbolic system can include a two-symbol system associated with a binary number system. In some instances, the binary code 304 can be interpreted using other number systems, such as a hexadecimal number system. In some instances, the binary code 304 can be generated (e.g., using a compiler) from source code associated with a human-readable programming language.

The binary code 304 can include one or more function call sites (e.g., a line(s) of code where a function is called). In some instances, the one or more function call sites can include a call(s) to one or more libraries and can include, for example, a system call(s) and/or a privileged non-system call(s), as described herein. For example, the binary code 304 can include user-privileged code that uses external calls to dynamically linked system libraries (e.g., DLLs). In some instances, the function call(s) can include an indirect function call(s), where a memory address(es) associated with the function to be called is not included in the binary code 304. In some instances, an indirect function call can be associated with a pointer (e.g., a reference) to an address of a function, where the address is not determined until runtime (as opposed to, for example a compile time associated with the generation of the binary code 304).

For example, rather than pointing directly to an address of an instruction/function to be executed, an indirect function call can include a pointer to a register and/or memory location (e.g., as determined by a linker during a compile time that results in the binary code 304) that can be loaded (e.g., via a loader) with an address of the function/instruction to be executed as a result of the function call. Said differently, an indirect function call site can include code that specifies an indirect jump (e.g., a location in memory/address that an address to the associated function is stored). In some instances, the linker can generate and/or configure a jump table (e.g., an array of pointers) that can store pointers to jump target addresses of functions. The linker can also modify the one or more function call sites included in the binary code 304 to include the pointers included in the jump table. At runtime (e.g., when the binary code 304 is to be executed), the loader can be configured to dynamically populate address values for the pointers in the jump table, where each address value is associated with a function to be called/invoked from a function call site. In some instances, a linker strategy can be known and/or predefined, such that the pattern analysis application 312 can interpret, without executing the binary code 304, an associated jump table provided as input to the pattern analysis application 312.

The behavioral specification 306 can include code associated with a domain-specific programming language (as described in relation to, for example, FIG. 4) and configured to describe/define a program behavior and/or control flow behavior. The behavioral specification 306 can be functionally and/or structurally (e.g., as to format, syntax, semantics, and/or the like) equivalent to the behavioral specification 406 of FIG. 4 described below. A control flow pattern can include, for example, an indication of an execution order of a set of at least one statement, instruction, code block, and/or function call. A function call can include, for example, a library call, a system call (e.g., a function call configured to request a service(s) from an operating system (e.g., the operating system 214 of FIG. 2)), a privileged non-system call (e.g., an instruction associated with a special permission(s), configured to have direct access to system resources, and/or configured to run in kernel mode), and/or the like. The behavioral specification 306 can be configured to define a plurality of types of control flow patterns, as described in relation to, for example, FIG. 4 herein.

The pattern analysis application 312 can be functionally and/or structurally similar to the pattern analysis application 112 of FIG. 1 and/or the pattern analysis application 212 of FIG. 2. The pattern analysis application 312 can include a decomposer 314, a compiler 316, a graph generator 315, and a search engine 318.

The decomposer 314 can be configured to automatically (e.g., without human intervention) decompose/segment code to reduce a problem size (e.g., an amount of code to be analyzed). For example, the decomposer 314 can be configured to generate a program chunk(s), which can include, for example, contiguous or noncontiguous segments of code, execution paths (e.g., sequences of instructions arranged in execution order), and/or subprograms. The program chunk can be smaller subset of code as compared to the overall code included in the binary code 304. The decomposer 314 can be configured to segment the binary code 304 based on, for example, code within the binary code 304 that is interrelated. Interrelated code can include, for example, code used to generate a result (e.g., an intermediate result) of interest. In some instances, interrelated code can exclude, for example, code that does not affect the value of interest. In some instances, a program chunk can include code associated with (e.g., used to implement and/or dependent upon) a function call. A program chunk generated by the decomposer 314 can include a reduced (e.g., minimal, near minimal, or approximately minimal) number of statements to be analyzed compared to the total number of statements included in the binary code 304. If multiple program chunks are generated from the binary code 304, the software code segments 300 can be configured to analyze the multiple chunks in parallel/concurrently (e.g., using parallel processing), resulting in improved efficiency and/or processing time. In some instances, the decomposer 314 can generate a plurality of program chunks, where each program chunk can be overlapping or non-overlapping relative to a remaining program chunk(s) from the plurality of program chunks.

The pattern analysis application 312 can be configured to use the graph generator 315 to identify, from the program chunk(s) generated by the decomposer 314, atoms (e.g., indivisible code units) that each defines a function call site. The function call sites can be associated with, for example, external calls to dynamically linked system libraries. To identify these function call sites (atoms) without referencing source code used to generate the binary code 304, the pattern analysis application 312 can be configured to use the map 302 to identify function call sites included in the binary code 304 (e.g., by resolving pointers).

The map 302 can be configured to provide a mapping between a binary instruction included in the binary file 304 and a tag. The tag can include, for example, an indication of computational behavior that can provide meaning to a user. For example, the tag can include an indication (e.g., an address and/or pointer) of a function associated with the binary instruction if, for example, the binary instruction includes a function call site. The map 302 can include, for example, an import address table (e.g., a registry key) that defines a list of base dynamic link libraries (DLLs) in memory. A DLL can include, for example, a library of shared function calls. The import address table can include addresses of functions associated with the DLLs and pointers associated with the function call sites (e.g., atoms) identified in the program chunks and/or binary code 304. The pattern analysis application 312 can use the import address table to resolve a pointer associated with an indirect function call site (e.g., an atom) in the binary code 304. In some instances, the map 302 can include a jump table (e.g., an indirect jump table), a shared library object, a relocation table, and/or the like. In some instances, the map 302 can include a software segment configured to dynamically load a dynamic link library (DLL) associated with the binary code 304 to determine a function associated with a call site (e.g., an atom) in the program chunk(s) and/or binary code 304. In some instances, the map 302 can include a datatype manager and/or knowledge base that is configured to track calling conventions associated with function calls. In some instances, the pattern analysis application 312 can be configured to determine a function associated with a direct system call site by using a process environment block (e.g., a data structure that includes information about a process) to determine an address of a kernel DLL.

Based on the map 302, the program analysis application 312 can be configured to cause a processor (e.g., the processor 220 of FIG. 2) to execute machine-readable code to retrieve one or more targets of one or more library function call sites included in the binary code 304. In some instances, the one or more targets can include one or more functions to be called, and these one or more functions can be reachable (e.g., called based on) one or more indirect jumps. The machine-readable code can include, for example, one or more indirect jump target computations configured to determine at least one memory address associated with a target (e.g., function). An indirect jump target computation can include, for example, a lookup operation within a data structure (e.g., a table) associated with the map 302 and configured to store at least one address value based on an index (e.g., a tag, pointer, etc.).

The graph generator 315 can represent the identified atoms as nodes in a graph data structure (e.g., a control flow graph). In some instances, the graph generator 315 can generate a control flow graph for each program chunk generate by the decomposer 314. This graph data structure can represent instruction paths (e.g., edges) between nodes (e.g., atoms) that can be traversed during execution of the program. For example, the graph data structure can represent a temporally ordered sequence of function calls implemented by the function call sites (e.g., atoms) included in a program chunk. A control flow graph can be traversed (e.g., searched) by a search engine (e.g., the search engine 318), as described herein.

To generate the search engine 318 to search the control flow graph(s) described above, the pattern analysis application 312 can include the compiler 316. The compiler 316 can include a compiler and/or interpreter configured to convert the behavioral specification 306 (e.g., code written in a high-level language (e.g., a domain-specific language and/or a language associated with source code) into machine language code (e.g., object code) that implements the search engine 318 and that can be executed by a processor (e.g., the processor 220 of FIG. 2). In some implementations, the compiler 316 can include a compiler configured to translate source code for a program (and, for example, check the source code for syntactic and/or semantic errors), such that the resulting object code can be subsequently executed via a processor. In some implementations, the compiler 316 can include an interpreter configured to translate, during execution of a program, a source code statement(s) to an object code statement(s). Said differently, an interpreter can cause a program (e.g., the search engine 318) to refer to source code (e.g., the behavioral specification 306) during the execution of that program. In some implementations, the compiler 316 can be associated with a regular expression library (e.g., CL-PPCRE). For example, the compiler 316 can be configured to generate, based on a text string(s) that describes a search pattern, code that can be executed to search for that pattern in other code (e.g., the binary code 304 and/or a program chunk(s) generated by the decomposer 314).

After the machine code/object code that implements the search engine 318 has been generated by the compiler 316, the pattern analysis application 312 can use the search engine 318 to search the control flow graph(s) to identify a control flow pattern(s) defined by the behavioral specification 306. To search a control flow graph, the search engine 318 can begin at a first atom (e.g., node) in the control flow graph and perform a graph search by traversing all paths that lead to remaining atoms in the control flow graph. The search engine 318 can be configured to indicate a match if the search engine 318 can connect atoms in an arrangement that is described by a pattern definition included in the behavioral specification 306. The resulting slices can be execution paths (sequences of instructions in execution order) or subprograms if they match conditional control flow constructs in the pattern. By searching the control flow graph(s), the search engine 318 can search for a pattern/arrangement of one or more function call sites included in the binary code 304 without referencing, accessing, and/or using a source code that was used to generate the binary code 304.

In some instances, an atom can include a sub-pattern (e.g., another pattern), and the search engine 318 can be configured to search that sub-pattern to determine whether the atom is associated with a pattern of interest (e.g., as defined by the behavioral specification 306). A pattern and/or sub-pattern can be associated with a pattern variable (e.g., a variable configured for alpha-renaming) to determine a relationship between patterns, sub-patterns, and/or atoms.

As a result of the search engine 318 identifying a pattern (e.g., at least one atom) defined by the behavioral specification 306, the pattern analysis application 312 can generate a signal that includes, for example, an output program slice 308. The output program slice 308 can indicate, for example, an execution path of atoms from the control flow graph that reflects the defined pattern (e.g., the arrangement of code). In some implementations, the pattern analysis application 312 can be further configured to output a Boolean indication (e.g., an alert, signal, and/or notification) indicating that the binary code 304 is, for example, either benign (e.g., based on no defined pattern being found) or malicious (based on a pattern being found).

Figure 4:
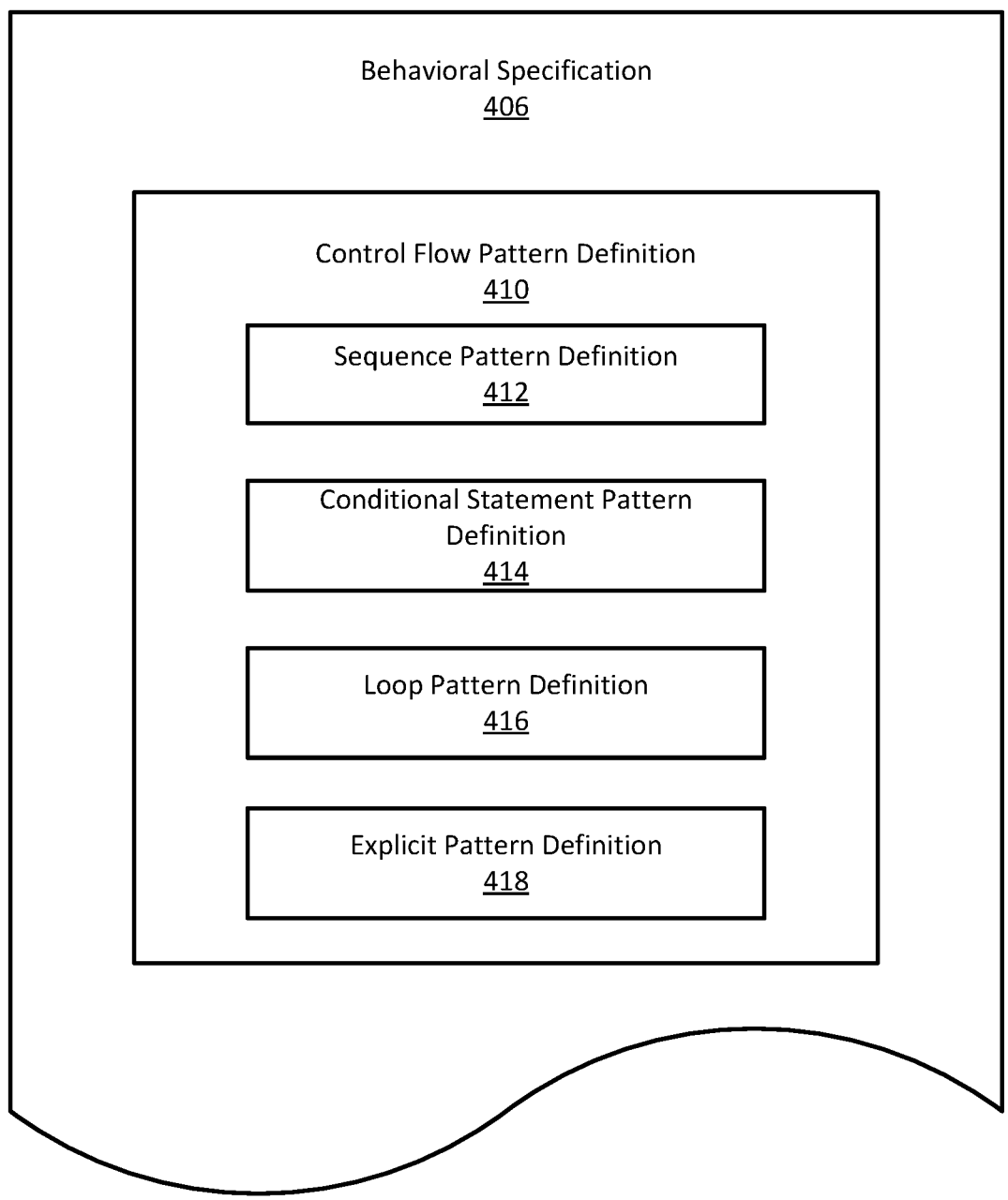
FIG. 4 is a schematic diagram of a behavioral specification used by a pattern analysis system to detect control flow patterns, according to some embodiments.

FIG. 4 is a schematic diagram of a behavioral specification 406 used by a pattern analysis system (e.g., the pattern analysis system 100 of FIG. 1) to detect control flow patterns, according to some embodiments. The behavioral specification 406 can be functionally and/or structurally (e.g., as to format) equivalent to the behavioral specification 306 of FIG. 3. The behavioral specification 406 can include, for example, descriptive code and/or a machine-readable specification that defines, for example, computational (e.g., control flow) patterns and/or distinguished software behaviors (e.g., behaviors associated with malware, vulnerable software, software having poor performance, etc.). The distinguished software behavior can be defined by a control flow pattern definition 410 included in the behavioral specification 406. For example, the control flow pattern definition 410 can include a machine-readable control flow pattern that defines an arrangement of one or more instructions, function calls (e.g., library function calls), etc.

The behavioral specification 406 can include a behavioral specification unit (BSU) for each specified pattern. A BSU can indicate a distinct pattern and can include, for example, a documentation comment, a name, at least one BSU parameter, and/or at least one rule. A documentation comment can include, for example, descriptive text that can help a reader of the behavioral specification 406 understand code/contents within. A BSU parameter can include, for example, a BSU name and/or a datatype reference annotation. The datatype reference annotation can indicate a datatype that can include, for example, a machine type (e.g., a type specified in C programming language) and/or a synthetic datatype associated with a BSU expression.

A BSU can cause a pattern analysis application to detect a match in a submitted software sample (e.g., the binary code 304) if at least one rule included in a BSU matches code segment (e.g., at least one instruction/function call) in the software sample. A rule included in a BSU can include, for example, a documentation comment, a rule name, at least one rule parameter, a pattern definition, an actions section, a location section, and/or a capture section. A pattern definition can define/specify, for example, a structure of code and/or an arrangement of instructions and/or function calls. A rule parameter can include, for example, a constraint on a value (e.g., an argument associated with a function call). In some instances, at least one rule parameter can be unassigned and/or not given a constraint. An unassigned rule parameter can be assigned a value according to the actions section of a rule. The actions section can include at least one parameter assignment based on an expression evaluation. The location section can include one or more expressions for specifying constraints on the values of rule parameters.

The capture section of a rule can be used, for example, to a populate BSU parameter(s). The capture section can include at least one assignment from an expression(s) to a BSU parameter(s). A rule parameter can refer to an input, since a value(s) from detected code can be assigned to a rule parameter(s), and a BSU parameter can refer to an output of the BSU. BSU parameters can be assigned values that are based on rules parameters. In some instances, however, a value assigned to rule parameters can be independent of BSU parameters. A BSU parameter can be assigned a value in the capture section. If a BSU parameter is not assigned a value in a rule's capture section, a compiler (e.g., the compiler 316 of FIG. 3) can flag that rule as a compile error.

A control flow pattern definition 410 included in a BSU can include, for example, a sequence pattern definition 412, a conditional statement pattern definition 414, a loop pattern definition 416, and/or an explicit pattern definition 418.

The sequence pattern definition 412 can specify, for example, a sequence (e.g., an ordered arrangement) of one or more sub-patterns. A sub-pattern can indicate, for example, one or more instructions and/or function calls. In some instances, a sub-pattern can be temporally arranged relative to another sub-pattern in a code segment (e.g., a processor can execute a first sub-pattern (e.g., instruction(s)) at a first time, and the processor can execute a second sub-pattern at a second time later than the first time. A rule that includes at least one sequence pattern definition 412 can cause a pattern analysis application to indicate a match if, for example, a software sample includes the sequence/arrangement/order of a sub-pattern(s) defined by the sequence pattern definition 412. In some instances, a sequence of at least one sub-pattern can include, for example, two sub-patterns that do not immediately follow each other (e.g., the two sub-patterns are not adjacent to each other and/or are separated by additional code, instruction(s), and/or function call(s)). For example, in some instances, a software sample can include code (e.g., code not associated with a sub-pattern and/or the sequence pattern definition 412) between detected instances of sub-patterns included in a sequence pattern definition 412. In such instances, the pattern analysis application can be configured to identify distinguished software behavior based on the non-contiguous sub-patterns. Said differently, a relationship between adjacent sub-patterns associated with a sequence pattern definition 412 can include an "eventually followed by" relationship and/or an "immediately followed by" relationship (e.g., a relationship between two contiguous sub-patterns. In some instances, the control pattern definition 410 can include an any-order pattern that defines a pattern of one or more instructions/function calls appearing in any order (e.g., and not in a specific order/arrangement).

A conditional statement pattern definition 414 can indicate, for example, a conditional expression pattern, an if-pattern, a then-block pattern, and/or an else-block pattern. A code segment (e.g., the binary code 304) included in a software sample can satisfy a conditional statement pattern definition 414 if, for example, (1) the branch condition of the code segment satisfies a constraint(s) imposed on the conditional expression of the conditional statement pattern definition 414, (2) the then-block of the code segment (e.g., code to be executed based on the branch condition evaluating as true) is associated (e.g., matches) with the then-block pattern of the conditional statement pattern definition 414, and/or (3) the else-block (e.g., code to be executed based on the branch condition evaluating as false) of the code segment is associated with the else-pattern of the conditional statement pattern definition 414.

A loop pattern definition 416 (e.g., a while-pattern) can include, for example, a conditional expression constraint and a do-pattern. A code segment (e.g., the binary code 304) included in a software sample can satisfy a conditional statement pattern definition 414 if, for example, (1) the condition associated with a while loop and included in the code segment satisfies the conditional expression constraint of the loop pattern definition 416, and (2) the do-block of the while loop and included in the code segment (e.g., code to be executed based on the condition evaluating as true) is associated (e.g., matches) with the do-pattern of the while pattern definition 416.

The explicit pattern definition 418 can include for example, a call pattern definition, an instruction pattern definition, and/or a wildcard pattern definition. A call pattern definition included in a BSU can, for example, cause a pattern analysis application to identify a code segment in binary code that includes a call to a function specified by the call pattern definition. An instruction pattern definition included in a BSU can, for example, cause a pattern analysis application to identify a code segment in binary code that includes an instruction specified by the call pattern definition. A wildcard pattern definition included in a BSU can, for example, cause a pattern analysis application to identify a code segment in binary code specified by the call pattern definition.

The following example code block illustrates an example BSU.

```

    description: Checks if a debugger is present and exits the
    program if it is
    parameters :
        - name: IsDebuggerPresent
          type: BOOL
          description: Result of call to IsDebuggerPresent

```

```
    BSU_START Debugger_Present ( IsDebuggerPresent : BOOL ) :
      RULE_START
        PARAMETERS: isDebuggerPresent
        PATTERN :
          SEQUENCE : {
            CALL: isDebuggerPresent = IsDebuggerPresent ( ) ;
            if isDebuggerPresent then CALL: ExitThisProcess (_,
    _);
          }
        WHERE :
          isDebuggerPresent != 0;
        CAPTURE :
          IsDebuggerPresent = isDebuggerPresent;
      RULE_END
    BSU_END
```

Example code associated with a domain-specific language used to compose a BSU is shown in the example code block below. A domain-specific language (DSL) can include, for example, a programming language configured to be used in a narrowed (e.g., specific) subset of at least one application. In some instances, a domain-specific language can be distinguished from, for example, a general-purpose language that can apply broadly across a plurality of domains/applications. A domain-specific language can include custom (e.g., unique) syntax to achieve a goal and/or implementation that can be used to solve a problem associated with the domain. For example, a domain-specific language associated with a BSU and specific to, for example, a software analysis domain, can include syntax that defines a control flow pattern, and this pattern definition can be used to solve the problem of identifying distinguished software behavior. In some instances, a domain-specific language can be used to express solutions in an idiom and at a level of abstraction associated with the problem domain (e.g., software/binary code analysis). For example, the example code block below includes domain-specific syntax configured to define rules, patterns (e.g., wildcard patterns, if-patterns, while-patterns, sequence patterns, any order (e.g., unordered and/or non-order specific) patterns, call patterns, instruction patterns, etc.), parameters, and/or the like, associated with a BSU.

```
BsuModel: (bsuDecls+=BsuDecl)*;
BsuDecl :
  (docComment=Documentation)?
  'BSU_START'
  name=ID
  '(' (params+=BsuParam (',' params+=BsuParam)*)? ')' ':'
    (rules+=BsuRule)*
  'BSU_END'
;
Documentation:
  comment=DOC_COMMENT
;
BsuParam: name=ID (':' typeRef=TypeRef)?;
TypeRef: name=ID ('*')* ;
BsuRule:
  (docComment=Documentation)?
  'RULE_START'
  ('NAME:' name=ID)?
  ('PARAMETERS:' params+=RuleParam
    (',' params+=RuleParam)* (',' )? )?
  'PATTERN:' pattern=Pattern
  ('ACTIONS:' ruleParamAssigns+=RuleParamAssignment ';')* )?
  ('WHERE:' (guards+=Expr ';')* )?
  ('CAPTURE:' (bsuParamAssigns+=BsuParamAssignment ';')* )?
  'RULE_END'
;
RuleParamAssignment:
  target=RuleParamRef '=' source=Expr
;
RuleParamRef : param=[RuleParam];
BsuParamAssignment:
  target=BsuParamRef '=' source=Expr
;
BsuParamRef : param=[BsuParam];
RuleParam: name=ID (':' typeRef=TypeRef)?;
Pattern :
  WildcardPattern |
  IfPattern |
  WhilePattern |
  SequencePattern |
  AnyOrderPattern |
  BsuCallPattern |
  ExtCallPattern |
  InstructionsPattern
;
WildcardPattern: {WildcardPattern} '_';
IfPattern :
  'if' condition=Expr 'then' thenPat=Pattern (=> 'else' elsePat=Pattern)?
;
WhilePattern :
  'while' condition=Expr 'do' doPat=Pattern
;
SequencePattern :
  'SEQUENCE:' '{' (patterns+=Pattern ';')+ '}'
;
AnyOrderPattern :
  'ANY_ORDER:' '{' (patterns+=Pattern ';')+ '}'
;
BsuCallPattern :
  'BSU:' bsu=[BsuDecl] '(' (args+=Expr (',' args+=Expr)*)? ')'
;
ExtCallPattern :
  'CALL:' (return Val=RuleParamRef '=')?
    funcRef=ExtFuncRef '(' (args+=Expr (',' args+=Expr)*)? ')'
;
ExtFuncRef: name=ID ;
InstructionsPattern :
  'INSTRUCTIONS:' '{' (instructions+=STRING ';')+ '}'
;
Expr:
  UnaryApplyExpr |
  InfixExpr
;
UnaryApplyExpr:
  operator=UnaryOperator arg=Expr
;
UnaryOperator :
  '*' | // Pointer-deference operator
  '&' | // Address-of operator
  '!' | // Boolean negation operator
  '-'   // Numeric negation operator
;
InfixExpr:
  left=QualifiedExpr (oper=InfixOperator right=Expr)?
;
QualifiedExpr:
  qualifier=ExprPrimary (selectors+=ElementSelector)*
;
ElementSelector :
  ListElementSelector |
  FieldElementSelector
;
ListElementSelector:
  '[' index=Expr ']'
;
FieldElementSelector:
  '.' field=ID
;
ExprPrimary :
  FunctionApplyExpr  |
  RuleParamRef       |
  VarLengthArg       |
  WildcardExpr       |
  StringExpr         |
  BoolExpr           |
  IntExpr            |
```

-continued

```
HexExpr          |
ParenExpr
;
FunctionApplyExpr:
  '@' funcRef=MetaFuncRef '(' (args+=Expr (',' args+=Expr)*)? ')'
;
MetaFuncRef: name=ID ;
VarLengthArg :
  {VarLengthArg} '...' paramRef=RuleParamRef?
;
WildcardExpr :
  {WildcardExpr} '_'
;
StringExpr :
  value=STRING
;
BoolExpr :
  isTrue ?= 'true' |
  isFalse ?= 'false'
;
IntExpr :
  value=INT
;
HexExpr :
  value=HEX
;
ParenExpr :
  '(' innerExpr=Expr ')'
;
InfixOperator:
  '&&'   | // AND boolean operator
  '||',  | // OR boolean operator
  '=='   | // EQUALS operator
  '!='   | // NOT EQUALS operator
  '>='   | // GREATER THAN OR EQUAL TO operator
  '<='   | // LESS THAN OR EQUAL TO operator
  '>'    | // GREATER THAN operator
  '<'    | // GREATER THAN operator
  '+'    | // PLUS operator
  '-'    | // SUBTRACT operator
  '*'    | // MULTIPLICATION operator
  '/'    | // DIVIDE operator
  '%'    | // MODULO operator
;
terminal HEX:
  ('0x'|'0X') ('0'..'9']'a'..'f']'A'..'F'|'_')+
  ('#'(('b'|'B')('i'|'I') | ('l'|'L')))?;
terminal DOC_COMMENT : '###' -> '###';
```

FIG. 5 is a flow diagram showing a method 500 for identifying one or more library function calls associated with a machine-readable control flow program. The method 500 can be implemented by a control flow analysis system described herein (e.g., the control flow analysis system 100 of FIG. 1). Portions of the method 500 can be implemented using a processor (e.g., the processor 220 of FIG. 2) of any suitable compute device (e.g., the compute device 110 of FIG. 1 and/or the compute device 201 of FIG. 2).

At 502, the method 500 includes receiving, at a processor (e.g., the processor 220 of FIG. 2), (1) machine-readable binary code (e.g., binary code 304 of FIG. 3) to be executed at a target processor (e.g., a processor included in the compute device 120 of FIG. 1) and (2) a machine-readable control flow pattern that includes one or more library function calls. The machine-readable control flow pattern can be included in, for example, the behavioral specification 306. At 504, the method 500 includes identifying, via the processor, an indication of an execution path in the machine-readable binary code based on the machine-readable control flow pattern. The identifying at 506 can be performed automatically (e.g., without human intervention) and in response to the receiving at 502. In response to the identifying at 504, the method 500 at 508 includes transmitting, via the processor, a signal that indicates that the machine-readable binary code includes the one or more library function calls included in the machine-readable control flow pattern. The signal can include, for example, a Boolean indication and/or an output program slice, as described herein.

Figure 6:
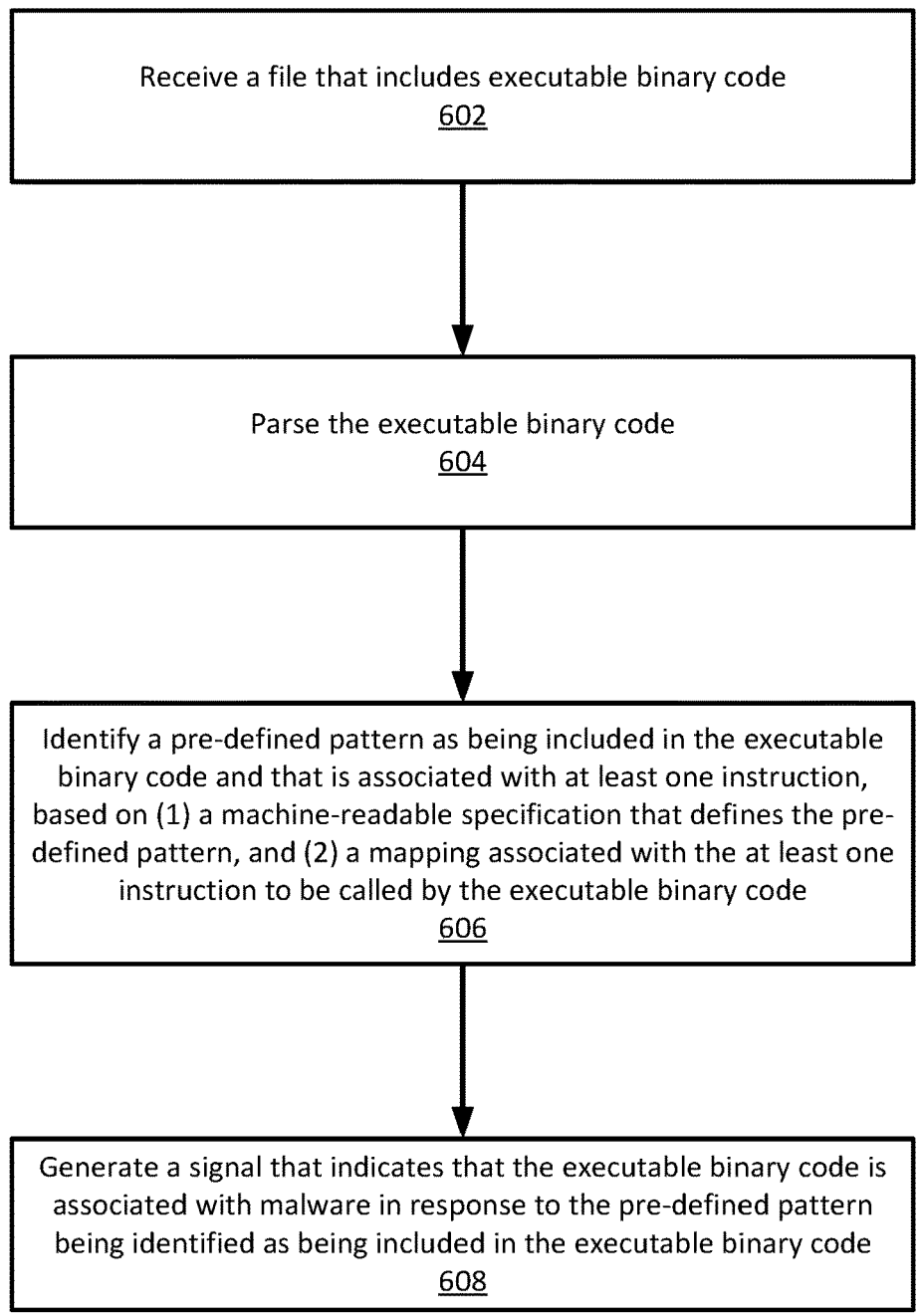
FIG. 6 is a flow diagram showing a method for identifying executable binary code associated with malware based on a pre-defined pattern, according to some embodiments.

FIG. 6 is a flow diagram showing a method 600 for identifying executable binary code associated with malware based on a pre-defined pattern. The method 600 can be implemented by a control flow analysis system described herein (e.g., the control flow analysis system 100 of FIG. 1). Portions of the method 600 can be implemented using a processor (e.g., the processor 220 of FIG. 2) of any suitable compute device (e.g., the compute device 110 of FIG. 1 and/or the compute device 201 of FIG. 2).

At 602, the method 600 includes receiving a file that includes executable binary code (e.g., the binary code 304 of FIG. 3). The method 600 at 604 includes parsing the executable binary code. The parsing can include, for example, generating program chunks to reduce a problem size. At 606, the method 600 includes identifying a pre-defined pattern (e.g., a pattern defined by the control flow pattern definition 410 of FIG. 4) as being included in the executable binary code and that is associated with at least one instruction. The identifying is based on, for example, (1) a machine-readable specification (e.g., the behavioral specification 306 of FIG. 3) that defines the pre-defined pattern, and (2) a map (e.g., the map 302 of FIG. 3) associated with the at least one instruction to be called by the executable binary code. For example, a compiler can be configured to automatically (e.g., without human intervention) generate a search engine based on the machine-readable specification, and the search engine can be configured to search the executable binary code for the pre-defined pattern. At 608, the method 600 includes automatically generating a signal that indicates that the executable binary code is associated with malware in response to the pre-defined pattern being identified as being included in the executable binary code.

Figure 7:
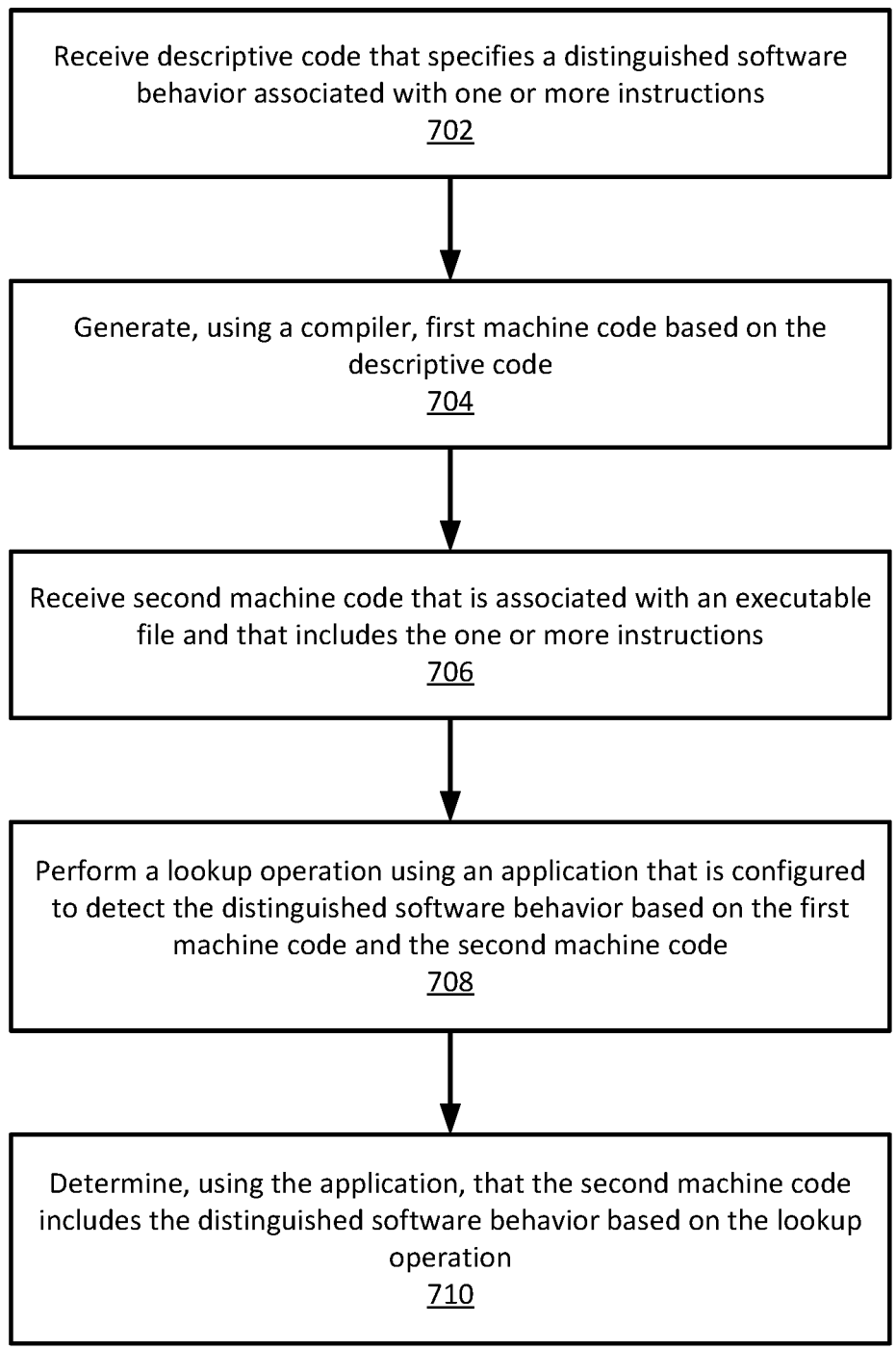
FIG. 7 is a flow diagram showing a method for determining that machine code includes a distinguished software behavior based on a lookup operation, according to some embodiments.

FIG. 7 is a flow diagram showing a method 700 for determining that machine code includes a distinguished software behavior based on a lookup operation. The method 700 can be implemented by a control flow analysis system described herein (e.g., the control flow analysis system 100 of FIG. 1). Portions of the method 700 can be implemented using a processor (e.g., the processor 220 of FIG. 2) of any suitable compute device (e.g., the compute device 110 of FIG. 1 and/or the compute device 201 of FIG. 2).

At 702, the method 700 includes receiving descriptive code (e.g., code included in the behavioral specification 306 of FIG. 3) that specifies a distinguished software behavior (e.g., a behavior associated with a control flow pattern defined by the control flow pattern definition 410 of FIG. 4) associated with one or more instructions. The method 700 at 704 includes generating, using a compiler (e.g., the compiler 316 of FIG. 3), first machine code (e.g., the search engine 318 of FIG. 3) based on the descriptive code. At 706, the method 700 includes receiving second machine code (e.g., the binary code 304) that is associated with an executable file and that includes the one or more instructions. The method 700 at 708 includes performing a lookup operation (e.g., based on the map 302) using an application (e.g., the pattern analysis application 312 of FIG. 3) that is configured to detect (1) the distinguished software behavior and (2) take as inputs the first machine code and the second machine code. At 710, the method 700 includes determining, using the application, that the second machine code includes the distinguished software behavior based on the lookup operation.

In an embodiment, a method includes receiving, at a processor, (1) machine-readable binary code to be executed at a target processor and (2) a machine-readable control flow pattern that includes one or more library function calls. The method also includes identifying, via the processor, an indication of an execution path in the machine-readable binary code based on the machine-readable control flow pattern. The method also includes transmitting, via the processor, a signal that indicates that the machine-readable binary code includes the one or more library function calls included in the machine-readable control flow pattern.

In some implementations, the one or more library function calls can include at least one of a system call or a privileged non-system call. In some implementations, the identifying can include executing, via the processor, machine-readable code to retrieve one or more targets of one or more library function call sites reachable by one or more indirect jumps. The identifying can further include comparing, via the processor, the one or more targets to the machine-readable control flow pattern. In some implementations, the identifying can include generating a control flow graph based on the machine-readable binary code, and the identifying can further include searching the control flow graph for the one or more library function calls based on the machine-readable control flow pattern. In some implementations, the identifying can include generating, via the processor, a plurality of segments of the machine-readable binary code, each segment from the plurality of segments being smaller than the machine-readable binary code. For each segment from the plurality of segments, the identifying can further include searching, via the processor, for the one or more library function calls in the segment of the machine-readable binary code based on the machine-readable control flow pattern.

In some implementations, the machine-readable control flow pattern can include at least one of (1) a sequence pattern, (2) an if-then pattern. (3) an if-then-else pattern, (4) a while pattern, or (5) a pre-defined code segment. In some implementations, the machine-readable control flow pattern can be associated with a domain-specific language for specifying at least one control flow pattern. In some implementations, the signal can include an indication of one or more slices of the machine-readable binary code.

In an embodiment, a non-transitory processor-readable medium stores code representing instructions to be executed by one or more processors, and the instructions include code to cause the one or more processors to receive a file that includes executable binary code and parse the executable binary code. The code also causes the one or more processors to identify a pre-defined pattern as being included in the executable binary code and that is associated with at least one instruction, based on (1) a machine-readable specification that defines the pre-defined pattern, and (2) a map associated with the at least one instruction to be called by the executable binary code. The code also causes the one or more processors to generate a signal that indicates that the executable binary code is associated with malware in response to the pre-defined pattern being identified as being included in the executable binary code.

In some implementations, the at least one instruction can include at least one of a system call or a library call. In some implementations, the map can be a map from the instruction to a tag. In some implementations, the instructions can cause the one or more processors to parse the executable binary code without executing the executable binary code. In some implementations, the pre-defined pattern can include at least one of (1) a contiguous sequence that includes the at least one instruction, (2) an intermittent sequence that includes the at least one instruction, (3) an ordered sequence that includes the at least one instruction, (4) an unordered sequence that includes the at least one instruction, (5) the at least one instruction executed conditionally, (6) the at least one instruction executed as part of a loop, or (7) a pre-defined instruction. In some implementations, the instructions can cause the one or more processors to identify the pre-defined pattern without referencing a source code associated with the executable binary code. In some implementations, the signal can include at least one of a Boolean indication or a slice of the executable binary code.

In an embodiment, a non-transitory processor-readable medium stores code representing instructions to be executed by one or more processors, the instructions including code to cause the one or more processors to receive descriptive code that specifies a distinguished software behavior associated with one or more instructions. The code also causes the one or more processors to generate, using a compiler, first machine code based on the descriptive code. The code also causes the one or more processors to receive second machine code that is associated with an executable file and that includes the one or more instructions. The code also causes the one or more processors to perform a lookup operation using an application that is configured to detect the distinguished software behavior based on the first machine code and the second machine code. The code also causes the one or more processors to determine, using the application, that the second machine code includes the distinguished software behavior based on the lookup operation.

In some implementations, the lookup operation can reference a tag associated with the distinguished software behavior. In some embodiments, the second machine code can be included in a binary file. In some implementations, the descriptive code that specifies the distinguished software behavior can include an indication of at least one of (1) a continuous sequence that includes the one or more instructions, (2) an intermittent sequence that includes the one or more instructions, (3) an ordered sequence that includes the one or more instructions, (4) an unordered sequence that includes the one or more instructions, (5) a conditional associated with the one or more instructions, (6) a loop that includes the one or more instructions, or (7) a definition that includes the one or more instructions. In some implementations, the descriptive code can be associated with a domain-specific language configured to describe computational patterns.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or." as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either." "one of," "only one of," or "exactly one of." "Consisting essentially of." when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:
1. A method comprising:
   receiving, at a processor, machine-readable binary code to be executed at a target processor;

receiving, at the processor, a machine-readable control flow pattern that includes one or more library function calls;

identifying, via the processor, an indication of an execution path in the machine-readable binary code based on the machine-readable control flow pattern; and transmitting, via the processor, a signal (1) that indicates that the machine-readable binary code includes the one or more library function calls included in the machine-readable control flow pattern and (2) to prevent the machine-readable binary code from being executed at the target processor.

2. The method of claim 1, wherein the one or more library function calls include at least one of a system call or a privileged non-system call.

3. The method of claim 1, wherein the identifying includes:

executing, via the processor, machine-readable code to retrieve one or more targets of one or more library function call sites reachable by one or more indirect jumps; and comparing, via the processor, the one or more targets to the machine-readable control flow pattern.

4. The method of claim 1, wherein the identifying includes:

generating a control flow graph based on the machine-readable binary code; and searching the control flow graph for the one or more library function calls based on the machine-readable control flow pattern.

5. The method of claim 1, wherein the identifying includes:

generating, via the processor, a plurality of segments of the machine-readable binary code, each segment from the plurality of segments being smaller than the machine-readable binary code; and for each segment from the plurality of segments, searching, via the processor, for the one or more library function calls in the segment of the machine-readable binary code based on the machine-readable control flow pattern.

6. The method of claim 1, wherein the machine-readable control flow pattern includes at least one of (1) a sequence pattern, (2) an if-then pattern, (3) an if-then-else pattern, (4) a while pattern, or (5) a pre-defined code segment.

7. The method of claim 1, wherein the machine-readable control flow pattern is associated with a domain-specific language for specifying at least one control flow pattern.

8. The method of claim 1, wherein the signal includes an indication of one or more slices of the machine-readable binary code.

9. A non-transitory processor-readable medium storing code representing instructions to be executed by one or more processors, the instructions comprising code to cause the one or more processors to:

receive a file that includes executable binary code;

parse the executable binary code;

identify a pre-defined pattern as being included in the executable binary code and that is associated with at least one instruction, based on (1) a machine-readable specification that defines the pre-defined pattern, and (2) a map associated with the at least one instruction to be called by the executable binary code; and generate a signal that (1) indicates that the executable binary code is associated with malware and (2) prevents the executable binary code associated with malware from being executed at a target processor, in response to the pre-defined pattern being identified as being included in the executable binary code.

10. The non-transitory processor-readable medium of claim 9, wherein the at least one instruction includes at least one of a system call or a library call.

11. The non-transitory processor-readable medium of claim 9, wherein the map is a map from the at least one instruction to a tag.

12. The non-transitory processor-readable medium of claim 9, wherein the instructions cause the one or more processors to parse the executable binary code without executing the executable binary code.

13. The non-transitory processor-readable medium of claim 9, wherein the pre-defined pattern includes at least one of (1) a contiguous sequence that includes the at least one instruction, (2) an intermittent sequence that includes the at least one instruction, (3) an ordered sequence that includes the at least one instruction, (4) an unordered sequence that includes the at least one instruction, (5) the at least one instruction executed conditionally, (6) the at least one instruction executed as part of a loop, or (7) a pre-defined instruction.

14. The non-transitory processor-readable medium of claim 9, wherein the instructions cause the one or more processors to identify the pre-defined pattern without referencing a source code associated with the executable binary code.

15. The non-transitory processor-readable medium of claim 9, wherein the signal includes at least one of a Boolean indication or a slice of the executable binary code.

16. A non-transitory processor-readable medium storing code representing instructions to be executed by one or more processors, the instructions comprising code to cause the one or more processors to:

receive descriptive code that specifies a malware behavior associated with one or more instructions;

generate, using a compiler, first machine code based on the descriptive code;

receive second machine code that is associated with an executable file and that includes the one or more instructions;

perform a lookup operation using an application that is configured to detect the malware behavior based on the first machine code and the second machine code;

determine, using the application, that the second machine code has the malware behavior based on the lookup operation; and in response to determining that the second machine code has the malware behavior, cause the second machine code to be prevented from being received at a target processor.

17. The non-transitory processor-readable medium of claim 16, wherein the lookup operation references a tag associated with the malware behavior.

18. The non-transitory processor-readable medium of claim 16, wherein the second machine code is included in a binary file.

19. The non-transitory processor-readable medium of claim 16, wherein the descriptive code that specifies the malware behavior includes an indication of at least one of (1) a continuous sequence that includes the one or more instructions, (2) an intermittent sequence that includes the one or more instructions, (3) an ordered sequence that includes the one or more instructions, (4) an unordered sequence that includes the one or more instructions, (5) a conditional associated with the one or more instructions, (6)

a loop that includes the one or more instructions, or (7) a definition that includes the one or more instructions.

20. The non-transitory processor-readable medium of claim 16, wherein the descriptive code is associated with a domain-specific language configured to describe computational patterns.

* * * * *